United States Patent [19]

De Boel

[11] 4,268,581

[45] May 19, 1981

[54] FIRE-SCREENING GLAZING PANELS AND METHOD OF MANUFACTURING SAME

[75] Inventor: Marcel De Boel, Chatelineau, Belgium

[73] Assignee: BFG Glassgroup, Paris, France

[21] Appl. No.: 46,934

[22] Filed: Jun. 8, 1979

[30] Foreign Application Priority Data

Jun. 14, 1978 [GB] United Kingdom ............... 26974/78

[51] Int. Cl.³ .............................................. B32B 17/06
[52] U.S. Cl. .................... 428/428; 156/104; 156/106; 428/446; 428/913; 428/921
[58] Field of Search .................. 428/68, 76, 330, 34, 428/331, 410, 428, 446, 913, 920, 921; 156/99, 106, 100, 104; 52/232

[56] References Cited

U.S. PATENT DOCUMENTS

| | | | |
|---|---|---|---|
| 3,365,322 | 1/1968 | Hinds | 428/921 |
| 3,466,222 | 9/1969 | Curtis | 428/313 |
| 3,640,837 | 2/1972 | Gaeth et al. | 428/428 |
| 3,769,073 | 10/1973 | Roth | 428/313 |
| 3,912,542 | 10/1975 | Hirano et al. | 156/104 |
| 3,974,316 | 8/1976 | Jacquemin et al. | 428/410 |
| 3,997,700 | 12/1976 | Jacquemin et al. | 428/410 |
| 4,015,386 | 4/1977 | Cook | 428/921 |
| 4,024,310 | 5/1977 | Wooler et al. | 428/921 |
| 4,122,203 | 10/1978 | Stahl | 428/315 |
| 4,175,162 | 11/1979 | De Boel et al. | 428/428 |

FOREIGN PATENT DOCUMENTS 2507244 10/1975 Fed. Rep. of Germany ........ 428/34

*Primary Examiner*—William J. Van Balen

*Attorney, Agent, or Firm*—Cushman, Darby & Cushman

[57] ABSTRACT

A method of manufacturing a fire-screening glazing panel comprising at least one layer of intumescent material 15 sandwiched between two structural plies 13, 14 of the panel comprises forming the layer and securing the plies together.

In order to avoid or reduce problems associated with drying the layer 15, an assembly is made in which the structural plies 13, 14 sandwich a layer 15 of intumescent material which is constituted by one or more materials of which at least the greater part by volume is in granular form.

In a second aspect, in order to facilitate degassing of the intumescent layer, such layer 15 contains intumescent material of which at least part is in the form of grains, and the intumescent material is subjected to suction at the edges of the assembly (e.g. using a vacuum pump 10 connected to an edge sealing tube 12) in a degassing step and the assembly is subjected to heat (e.g. by heaters 7,8) and/or pressure conditions (e.g. by pump 9) to cause the grains in the layer to become assimilated into an intumescent body which bonds the plies 13,14 together.

The invention includes an intermediate product comprising a structural ply bearing an adherent layer constituted by material of which at least the greater part by volume consists of grains of intumescent material, to panels in which such a layer is sandwiched between two structural plies and to panels made by a method as described above.

20 Claims, 7 Drawing Figures

FIRE-SCREENING GLAZING PANELS AND METHOD OF MANUFACTURING SAME

The present invention relates to a method of manufacturing a fire-screening glazing panel comprising at least one layer of intumescent material sandwiched between two structural plies of the panel, such method comprising forming a said layer and securing the plies together.

Hitherto, such panels have been made by drying a solution of the intumescent material to form a solid stratum of the intumescent material either directly on a first glazing sheet, or separately and then applying it to a first glazing sheet, whereafter the second glazing sheet of the pair is applied to the intumescent material. The layer of intumescent material in the thus-formed panel may be built up from several such solid strata.

The formation of a solid stratum using a solution of intumescent material and its subsequent incorporation into a panel can give rise to certain problems.

Hitherto, such layers of intumescent material have been formed by drying a solution of the desired material. This drying step has usually taken a considerable time which is of course disadvantageous especially in commercial series production of fire-screening glazing panels.

It is an object of the present invention in a first aspect thereof to provide a more rapid process for the production of such panels.

According to the present invention in its first aspect, there is provided a method of manufacturing a fire-screening glazing panel comprising at least one layer of intumescent material sandwiched between two structural plies of the panel, such method comprising forming a said layer and securing the plies together, characterised in that an assembly is made comprising said two structural plies and at least one sandwiched intumescent layer which is constituted by one or more materials of which at least the greater part by volume is in granular form.

Thus by making use of the present invention in its first aspect the layer drying step can be avoided so that production can be speeded up.

The expression glazing material is used herein in a broad sense, and includes sheet plastics materials and vitreous materials which may be used for glazing purposes, whether transparent or not.

Reference has been made to securing said plies together. This may be done before or after formation of the layer and may be done simply by enclosing the plies in a frame, but preferably, the sandwich is subjected to heat and/or pressure conditions so that the plies become bonded together by the sandwiched instumescent material, without causing said intumescent material to become tumid. This has the effect of forming a solid body of intumescent material thus stabilizing the layer mechanically, and it also increases the light transmitting power of the body as compared with a layer consisting solely of grains.

Advantageously, in a degassing step, the or each intumescent layer is subjected to suction at the edges of the sandwich assembly. This feature gives particularly important advantages especially when the sandwich is also heated so that it becomes bonded together. Indeed in this way it is possible to convert the granular intumescent material into a uniform homogeneous solid layer. Thus by suitable choice of the intumescent material it is possible to form transparent fire-screening glazing panels.

The light transmitting power of the intumescent material is often very important. Fire screening glazing panels are often required to be installed as inspection panels in "fireproof" doors, and these must obviously be transparent. Hitherto efforts to increase the transparency of a body of intumescent material have concentrated on the formation of a solid layer prior to its incorporation into the panel. In particular efforts have been concentrated on the removal of bubbles from the layer and on the quality of its surface. It has now been found, rather surprisingly, that it is possible to form an intumescent layer in situ from granular material and that such a body can have a very high degree of transparency.

It has also been found however that the use of granular intumescent material affords certain advantages in certain processes in which structural plies of a fire-screening glazing panel are bonded together via sandwiched intumescent material, even when such intumescent material includes preformed layers.

Accordingly, in its second aspect, the present invention provides a method of manufacturing a fire-screening glazing panel comprising at least one layer of intumescent material sandwiched between two structural plies of the panel, such method comprising forming a said layer and securing the plies together, characterised in that an assembly is formed comprising said two structural plies and at least one sandwiched layer which contains intumescent material of which at least part is in the form of grains, in that the intumescent material is subjected to suction at the edges of the assembly in a degassing step, and in that the assembly is subjected to heat and/or pressure conditions to cause the grains in the or each said layer to become assimilated into an intumescent body via which said structural plies are bonded together. The use of such grains between plies of the sandwich assembly has the advantage of separating them to leave pathways via which gases in the interply spaces may be sucked of, and this facilitates degassing and thus promotes firm bonding and the absence of entrapped air bubbles in the final product.

In the most preferred embodiments of the second aspect of the invention, the or at least one said intumescent layer is constituted by material of which at least the greater part by volume is in granular form.

When operating in accordance with either aspect or both aspects of the invention, it is preferred that, in said degassing step, the intumescent material is subjected to a sub-atmospheric pressure having an absolute value of between 1 mm Hg and 250 mm Hg. Pressures within this range have been found sufficiently low to provide satisfactory degassing.

Preferably, the or at least one said intumescent layer is constituted by one or more materials of which at least 70% by volume is in granular form, and in some preferred embodiments of the invention, the or at least one said intumescent layer is constituted by material in granular form held together by a binder. The use of a binder, which may for example be present in an amount of 5 to 40% by volume of the volume of the granular material (4.8% to 28.6% by volume of the layer), helps to stabilise the layer, e.g. before assembly of the panel.

When a binder is used, it is preferably water or an aqueous solution of the intumescent material. These are convenient readily available binder materials. The amount of binder used and its water content, and the water content of the granular material are suitably chosen to confer a desired water content on the intumescent layer, so as to wholly avoid the necessity for any drying step. If the intumescent material is to be subjected to sub-atmospheric pressure in a degassing step, a slight excess of water may be present, since this can be sucked off during conversion of the layer to a body which bonds the plies of the panel together.

This feature is also important because it allows more flexibility in the selection of the granular intumescent material. Generally speaking, to provide good fire screening properties, it is preferred that a layer of hydrated alkali metal silicate (which is an especially preferred intumescent material) should comprise 30 to 40% by weight of residual water, for example 30 to 35%. It should be borne in mind that the cohesiveness of the layer will be greater with reduced amounts of water, but that the more water is present, the more efficacious will the layer be as an intumescent fire-screening barrier. The use of a binder which is a solution of the intumescent material enables the degree of hydration of the granular material to be selected for other reasons such as ease of handling and availability, and the total degree of hydration of the layer can be brought to its optimum value by the choice of a said binder solution of appropriate strength.

For example sodium silicate grains hydrated to below 30% water by weight may be held in a binder which is a solution of hydrated sodium silicate of such strength as to bring the total amount of water present in the layer to between 30% and 35% by weight of the layer.

The binder material may be applied to a structural ply of the panel before the grains of intumescent material.

Preferably, at least 90% of the weight of the granular material has a grain size of at least 0.1 mm. This is found to promote transparency when a layer of granular material is converted into a body which bonds the plies together, especially when the layer is formed exclusively of grains.

Advantageously the maximum grain size is 2.5 mm or less. Such preferred maximum grain size will depend on the total thickness of the layer or body to be formed, and the cited value is especially convenient for layer or body thicknesses below 8 mm as are preferred.

The invention includes a fire-screening glazing panel made by a method as above defined.

The invention also provides a fire-screening glazing panel comprising at least one layer of intumescent material sandwiched between structural plies of glazing material, characterised in that the or at least one said sandwiched intumescent layer consists of one or more materials of which at least the greater part by volume is in granular form.

The invention extends to a novel intermediate product useful for forming a panel according to the invention, which product comprises a structural ply of glazing material bearing an adherent layer of which at least the greater part by volume consists of grains of intumescent material.

In some preferred embodiments of a said panel or of such intermediate product, said grains are embedded in a binder, and preferably also, such binder is a solution of said intumescent material.

In other preferred embodiments, said grains are subjected to a heat treatment such as to cause them partially to coalesce, in a manner analogous to sintering.

Preferably, said intumescent material comprises a hydrated alkali metal salt.

Examples of alkali metal salts which can be used in hydrated form are as follows: potassium aluminate, potassium plumbate, sodium stannate, potassium stannate, sodium aluminium sulphate, potassium aluminium sulphate, sodium borate, potassium borate and sodium orthophosphates.

Hydrated alkali metal silicates, for example sodium silicate, are especially suitable for use in a said layer of intumescent material.

Such substances have very good properties for the purpose in view. They are in many cases capable of forming transparent layers which adhere well to glass or vitro-crystalline material. On being sufficiently heated, the combined water boils and the layers foam, so that the hydrated metal salt is converted into an opaque, solid, porous mass of cellular form in which it is highly thermally insulating and remains adherent to the glass or vitro-crystalline material.

This feature is particularly important, because even if all the structural plies of the panel are cracked or broken by thermal shock, the panel may retain its effectiveness as a barrier against heat and fumes since the fragments of the plies may remain in position bonded together by the converted metal salt.

Advantageously, each of said structural plies is of vitreous material, to provide a hard wearing surface. Such vitreous material may be tempered, e.g. chemically tempered, to increase its resistance to thermal shock.

It has been found that vitreous sheets may suffer deterioration to varying degree by prolonged contact with various intumescent materials, e.g. hydrated metal salts. This is particularly important in the case of transparent or coloured sheets, since they may suffer a loss of transparency or undergo a change in colour.

Advantageously, therefore, a protective coating is formed on at least one and preferably each vitreous ply face before said intumescent material is applied to such face, and said protective coating is composed of a substance selected so as to inhibit interaction between said intumescent material and such ply face.

Such a protective coating preferably comprises an anhydrous metal compound deposited onto one or more ply faces, since such coatings can form very effective protective strata.

Preferably, said anhydrous metal compound is deposited by hydrolysis, since this is convenient in practice. Another very convenient way of depositing said anhydrous metal compound is by pyrolysis.

Preferably a said protective coating is between 300 and 1,000 Angstrom units thick, so as to provide a non-porous coating without giving rise to unsightly interference effects.

Clearly, one criterion affecting choice of a suitable coating material will be the composition of the intumescent material. By way of example, when said intumescent material comprises an hydrated metal salt selected from sodium aluminium sulphate, and alkali metal silicates, said anhydrous metal compound is preferably selected from zirconium oxide and anhydrous aluminium phosphate.

This invention does not exclude the use of other materials, for example, titanium oxide and tin oxide.

Alternatively, or in addition, a coating having other properties may be applied to a vitreous sheet of the panel. For example an infra-red reflecting coating of a noble metal, copper, aluminium or an oxide may be applied and this will have the advantage of affording some protection for the intumescent material against the absorption of infra-red radiation which could cause the intumescent material to become opaque and blister even before the advent of fire. Furthermore, the use of such an infra-red reflecting coating can increase the time taken for the layer to intumesce on the outbreak of fire, and this will in turn increase the time for which protection is given.

Embodiments of the invention selected by way of example, will now be described with reference to the accompanying diagrammatic drawings in which.

Figure 1:
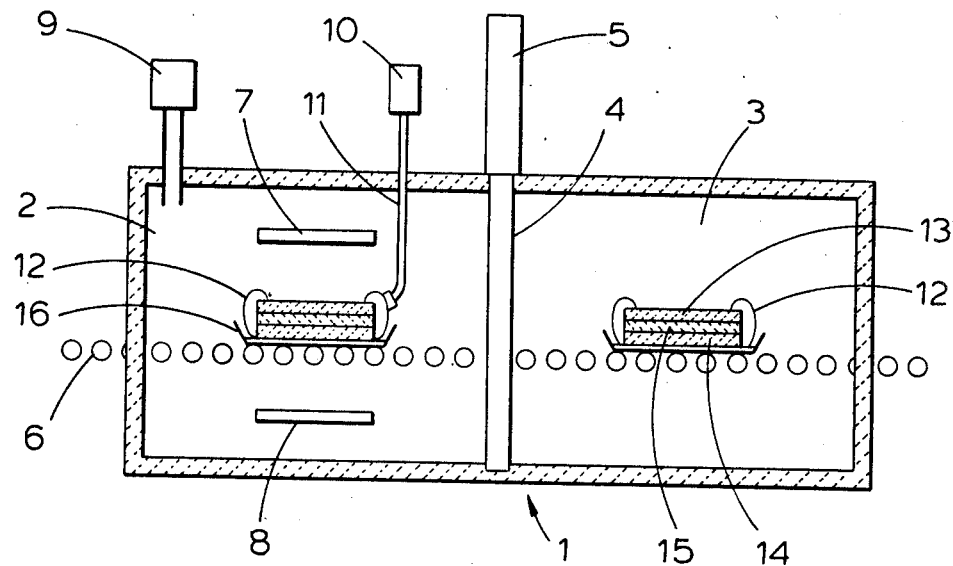
FIG. 1 is a vertical longitudinal cross-section of an apparatus for performing a bonding treatment in accordance with the invention.

The apparatus illustrated in FIG. 1 comprises an enclosure 1, divided into two chambers 2 and 3 by a partition 4, which is controlled by an automatic mechanism 5. A roller conveyor 6 is arranged with the conveying reach following a course through the chambers 2 and 3 up to a discharge station (not shown), and its return reach running beneath the enclosure 1, back to a loading station (not shown).

The compartment 2 is provided with heating elements 7 and 8. Two vacuum pumps 9 and 10 are associated with the chamber 2. Pump 9 is connected to the environment atmosphere within the compartment 2 and the pump 10 is connected via a conduit 11 to a sealing tube 12 which is made of flexible material.

The apparatus functions in the following manner:

The flexible sealing tube 12 is an endless tube which is open at its inner periphery and is fitted to the margin of the sandwich which is to form the laminate. The sandwich shown comprises two glass sheets 13 and 14 and an intervening layer 15 comprising grains of intumescent material. This sandwich is placed on a carriage 16 which is conveyed into chamber 2 by the roller conveyor 6, the entrance to the chamber then being closed. The heating elements 7, 8 maintain the temperature in this chamber at a suitable temperature.

On being introduced into the compartment 2, the sandwich is immediately heated. At the same time, the vacuum pump 9 creates in the compartment 2 a pressure which is below atmospheric, and the vacuum pump 10 creates a sub-atmospheric pressure in the flexible sealing tube 12 which encloses the edges of the assembly.

This edge pressure is preferably less than 250 mm Hg and is also preferably less than the environment subatmospheric pressure within the chamber 2.

The most suitable pressure and temperature schedule may depend on a number of factors such as the material of which the grains are formed, the grain size and moisture content and in some cases, the amount of binder used if any is present.

Figure 2:
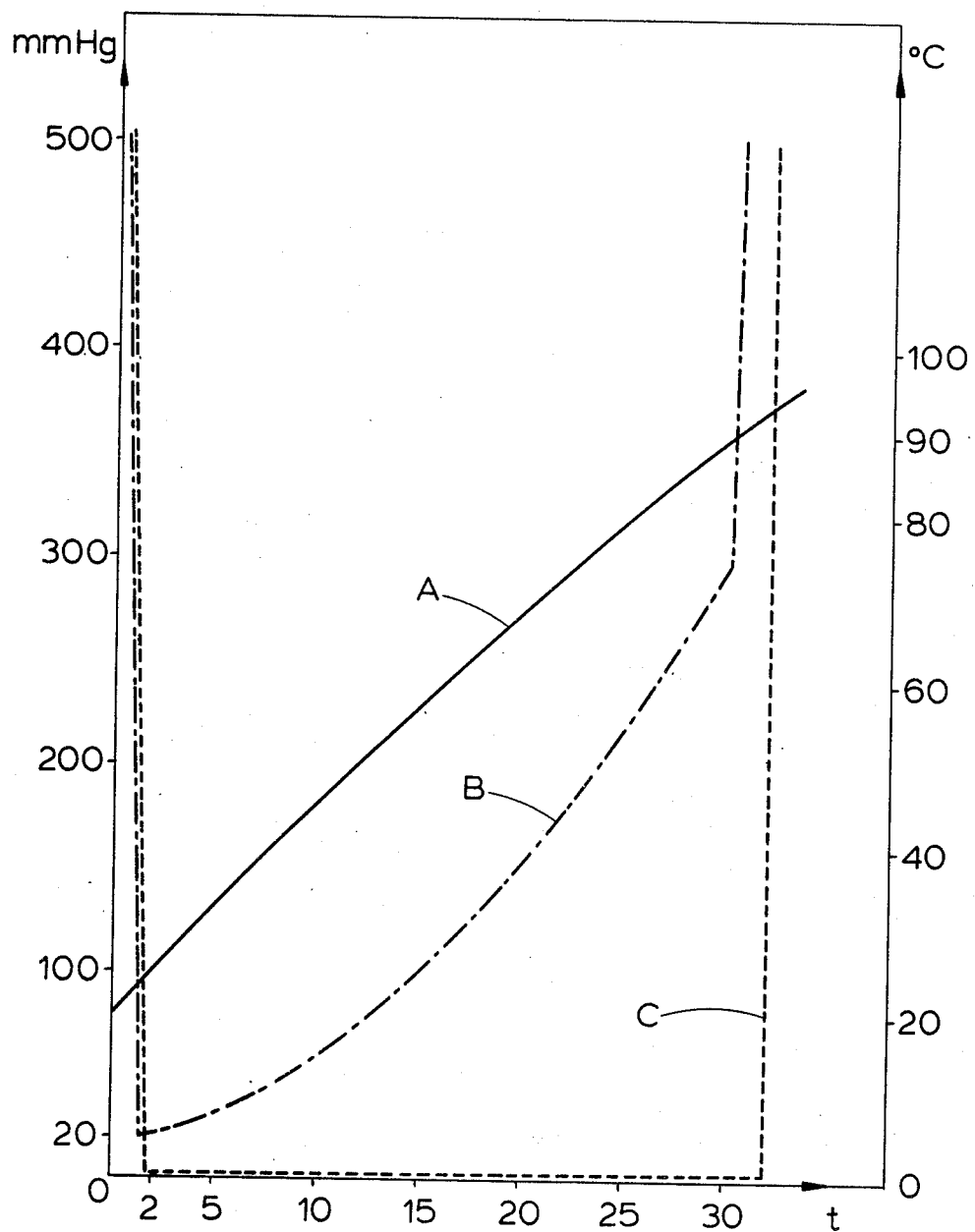
FIG. 2 is a graph showing how temperature and pressures are varied during the course of treatment.

FIG. 2 illustrates a suitable pressure and temperature schedule for the case where the intervening layer 15 initially contains closely packed grains of hydrated sodium silicate having a water content of 33% by weight and a mean diameter of 1.2 mm. This schedule is suitable for use whether or not a binder is present.

Referring now to FIGS. 1 and 2, a sandwich assembly 13, 14, 15 fitted with a sealing tube 12 is conveyed into the first chamber 2 and is immediately heated. The solid line indicated at A in FIG. 2 shows the temperature of the sandwich assembly over the course of time. It is assumed that the sandwich assembly is at room temperature (20° C.) when it is introduced into the chamber 2 and its temperature rises initially by some $2\frac{1}{2}°$ C. per minute. The temperature of the chamber 2 is maintained at approximately 120° C., so that at the end of 30 minutes the sandwich is at a temperature of about 90° C.

As soon as the sandwich assembly is in the chamber 2, vacuum pumps 9 and 10 are switched on to reduce the environmental pressure in the chamber and the pressure within the edge sealing tube 12 which acts directly on the intumescent layer 15. The environmental pressure schedule is indicated in FIG. 2 by dot-dash line B. The environmental pressure is reduced in about 1 or 2 minutes to some 20 mm Hg. The environmental pressure is then allowed to rise smoothly so that after 10 minutes it is about 60 mm Hg: after 20 minutes about 150 mm Hg: and after 30 minutes about 300 mm Hg. After the sandwich assembly has been in the chamber 2 for 30 minutes, (when the assembly has attained a temperature of about 90° C.) the environmental pressure is allowed to return from 300 mm Hg to atmospheric.

The edge pressure indicated by dotted line C in FIG. 2 is reduced to a value of about 1 mm Hg reaching this level some $1\frac{1}{2}$ to 2 minutes after introduction of the sandwich into the chamber 2. In fact it is difficult to measure this pressure accurately because of the physical construction of the vacuum conduit 11 and sealing tube 12, and it may for example be as much as 2 mm Hg. The edge pressure is maintained at 1 or 2 mm Hg until after the environmental pressure has reached a value of 300 mm Hg and preferably until after the environmental pressure has returned to atmospheric. In FIG. 2, the edge pressure is shown as being maintained at 1 or 2 mm Hg until 32 minutes have elapsed, when it is allowed to return rapidly to atmospheric.

The actual temperature and pressure schedules shown in FIG. 2 are only examples selected from the optimum ranges of temperature and pressure schedules. These ranges are as follows:

for the temperature of the sandwich assembly (measured at the surface of one of the glass sheets); rising from room temperature to between 100° C. and 55° C. after 30 minutes.

for the environmental pressure; an initial reduction to between 10 mm Hg and 100 mm Hg rising to between 200 mm Hg and 400 mm Hg after 30 minutes and prior to return to atmospheric pressure.

for the edge pressure; a reduction to below 20 mm Hg.

The difference between the environmental pressure (which acts on at least one of the sandwiching glass sheets 13, 14) and the edge pressure (which acts on the inter-layer 15 between those sheets) causes the glass sheets to be pressed together thus compacting the sandwiched intumescent material. Because of this, and because of the aspiration of air from between the glass sheets due to the reduced edge pressure, and because of the softening of the initially granular intumescent material due to the heating which takes place, the grains coalesce to form a homogeneous solid transparent body whose thickness is of course determined by the amount of intumescent material used in any given case. This body bonds the glass sheets together. In a following step, the environmental pressure in the chamber 2 may be increased, e.g. to 13 kg/cm² while the sandwich is heated to 135° C. This step enables the removal of any possible residual bubble from the sandwich and promotes firm bonding of the sandwich.

In cases where the intumescent material used to form the layer consists of grains and a binder rather than grains alone, the temperature/edge pressure schedule should be controlled so that the binder liquid does not boil.

After the desired treatment in the chamber 2 has been completed, the automatic mechanism 5 opens the partition 4 so as to permit the carriage 16 to be displaced by the conveyor 6 into the chamber 3 in which the pressure is progressively lowered and in which the sandwich becomes progressively cooled before being conveyed to the unloading station. If the high-pressure bonding step in the chamber 2 is omitted then the chamber 3 is maintained at atmospheric pressure.

Figure 3:
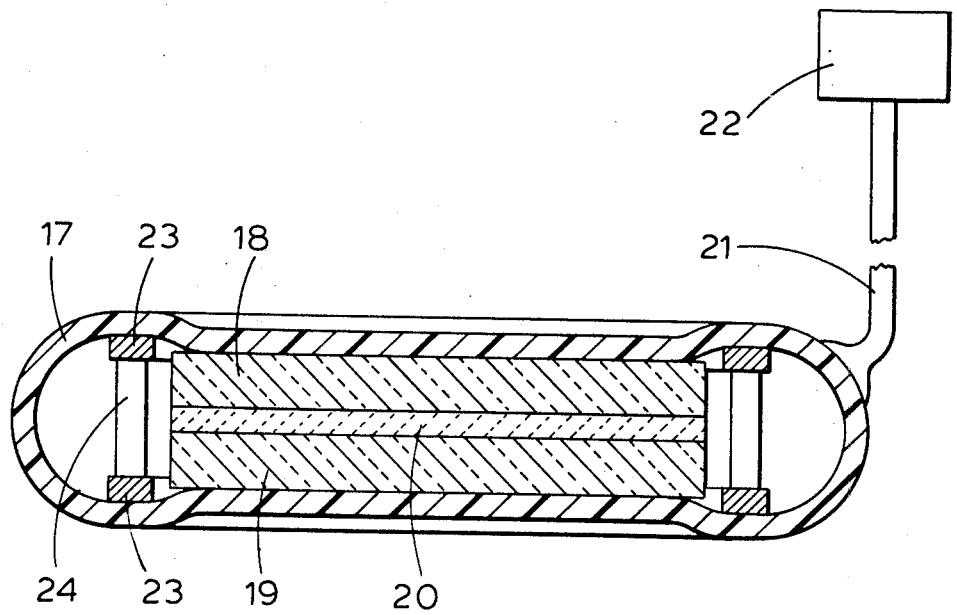
FIG. 3 is a cross-sectional elevation of an assembly located in an alternative form of edge-aspirating device.

FIG. 3 shows an alternative means for aspirating excess fluid substance(s) from the inter-sheet spaces of the sandwich at its edges. This means comprises an envelope 17 which encloses the entire sandwich comprising glass sheets 18 and 19 and an intervening layer 20 comprising grains of intumescent material. The envelope is connected by a vacuum line 21 to a pump 22 by which sub-atmospheric pressure can be maintained within the envelope to keep the inter-sheet spaces subjected to suction. When the pump is operated, the top and bottom walls of the envelope are drawn against the main external faces of the enclosed sandwich. However the envelope, at least at its peripheral zone, is sufficiently rigid to resist collapse against the edges of the sandwich so that a space at a sub-atmospheric pressure maintained by the pump 22 is preserved within the envelope, around the edges of the sandwich. The use of an envelope which encloses the sandwich affords the advantage that the size of the envelope in relation to the dimension of the sandwich is not critical. The envelope can be easily applied to sandwiches of a range of different sizes. In addition, the envelope does not hinder uniform heating of the whole sandwich. Furthermore, the use of such an envelope facilitates the application of uniform pressure over the whole area of the main faces of the sandwich during its treatment, so that reaction forces arising from pressure differences between the environment in which the envelope is placed and the space within the envelope will not be such as to cause flexure of the outer sheets 18, 19 of the sandwich. Such flexure could lead to the formation of bubbles in the margins of the layer 20 and can also lead to a non-flat final product.

In a variant of the embodiment just described, optional bracing means are provided for supporting reaction forces arising from pressure differences between the interior and exterior of the envelope 17. In FIG. 3, such bracing means are shown as a pair of frames 23 of the same shape as but slightly larger than the sandwich assembly 18, 19, 20 which are held spaced apart by a plurality of pillars such as 24. The frames 23 hold the envelope slightly away from the edges of the assembly.

A sandwich assembly may be treated by the process described with reference to FIGS. 1 and 2 using the envelope 17 in place of the edge sealing tube 12.

It is also possible to use the aspirating means shown in FIG. 3 in an alternative, simplified process in which the exterior of the envelope 17 is always subjected to atmospheric pressure. In an example of this simplified process, the pump 22 is switched on to reduce the pressure within the envelope, that is the pressure acting on the edges of the assembly, to between 10 and 250 mm Hg. This value is reached after about one or two minutes, and it is maintained for a further 40 to 45 minutes. The sandwich assembly is initially at room temperature (20° C.) and remains at this temperature for about 15 minutes after the pump 22 is switched on. The temperature is not increased during this initial period because it is believed the grains would soften and start to coalesce because of the wide difference between the edge pressure (below 250 mm Hg) and the environmental pressure (atmospheric) and this would impede degassing of the intumescent layer and the consequent entrapment of air bubbles in the finished panel. When forming transparent panels by the process of FIGS. 1 and 2 this early softening is not so important because of the lower difference between the edge and environmental pressures.

After 15 minutes, the sandwich assembly in the envelope 17 is heated uniformly so that it reaches a temperature of 90° C. after 45 minutes, and at this stage the pressure in the envelope is allowed to return to atmospheric. At the end of this time, the sandwich assembly is found to be bonded together as a transparent panel. Of course this panel may then be transferred to an autoclave for a subsequent high-pressure bonding step if desired.

Figure 4:
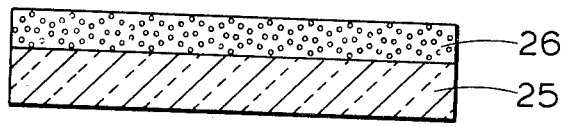
FIG. 4 is a cross-sectional view of an intermediate panel product according to the invention.

FIG. 4 shows a glass sheet 25 bearing a layer 26 comprising grains of intumescent material held in a binder constituted by an aqueous solution of that intumescent material.

Figure 5:
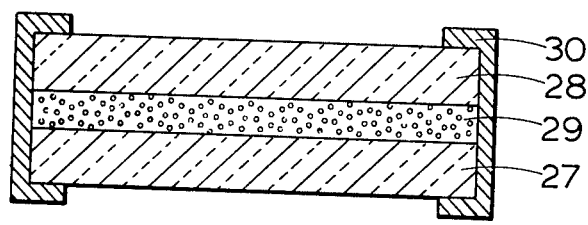
FIGS. 5, 6 and 7 are cross-sectional views of panels according to the invention.

FIG. 5 shows a fire screening glazing panel according to the invention which comprises two glazing sheets 27, 28 between which is sandwiched a layer 29 consisting of grains of intumescent material held in a binder. The embodiment illustrated in FIG. 5 may be considered as a final product, in which case the glazing sheets 27, 28 are secured together by means of a frame 30, or it may be considered as illustrating an intermediate stage in the manufacture, the sandwich assembly being intended for bonding together e.g. as described with reference to FIGS. 1 and 2.

Figure 6:
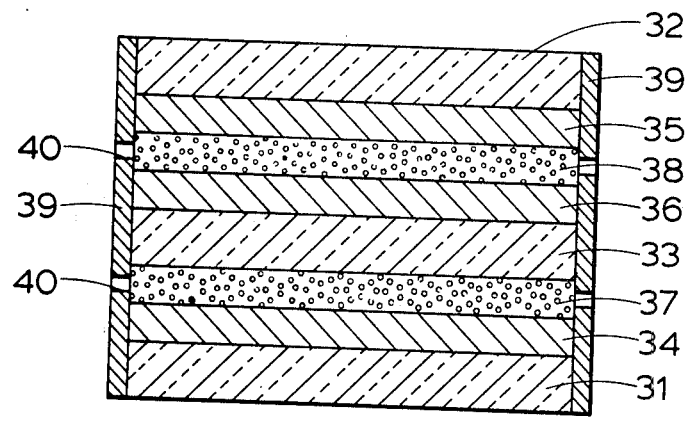

FIG. 6 shows a fire screening glazing panel assembly prior to its bonding together.

The assembly illustrated in FIG. 6 shows two vitreous sheets 31, 32 defining major faces of the assembly and an intervening sheet 33 of plastics glazing material. The sheet 31 bears on its face directed into the assembly a solid stratum 34 of intumescent material. The second vitreous sheet 32 likewise bears a solid intumescent stratum 35. The intervening glazing sheet 33 bears a single solid intumescent stratum 36 directed towards the second vitreous glazing sheet 32.

Strata of granular intumescent material 37, 38 are respectively located in spaces between the solid stratum 34 deposited on the first vitreous sheet 31 and the plastics glazing sheet 33, and between the solid stratum 36 on the plastics sheet 33 and the solid stratum 35 on the second vitreous glazing sheet 32.

The edges of the thus formed assembly are temporarily secured together by adhesive tape 39 which is porous or perforated with holes such as 40 to allow the inter sheet spaces to be subjected to suction.

In a variant of this embodiment, the first vitreous sheet 31, its associated intumescent stratum 34 and the contacting stratum 37 of granular intumescent material are dispensed with.

In a second variant of this embodiment, the second vitreous sheet 32, its associated intumescent stratum 35, the contacting granular stratum 38 and the intumescent stratum 36 on the plastics sheet 33 are dispensed with.

In a third variant (which may be combined with one or other of the first two variants) the plastics glazing sheet 33 is replaced by a vitreous sheet.

It will be appreciated that although it is convenient in practice, it is not necessary that the two layers respectively made up of the strata 34 and 37 and of the strata 35, 36 and 38 should be formed of the same intumescent material.

Figure 7:
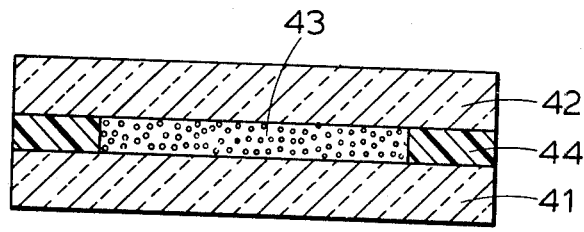

FIG. 7 shows a further embodiment of fire-screening glazing panel comprising two glass sheets 41, 42 and an intervening layer of intumescent material 43 which is surrounded by a body 44 of spacer material intervening between the margins of the glass sheets 41, 42.

EXAMPLE 1 (FIG. 4)

A glass sheet 25 which is 5 mm thick has deposited thereon a layer 26 of hydrated sodium silicate 2 mm thick. The layer 26 was made up of grains of dry hydrated sodium silicate (26% by weight $H_2O$) of sizes between 0.1 mm and 0.4 mm obtained by sifting through sieves of appropriate mesh sizes, in a binder solution of hydrated sodium silicate containing 67% $H_2O$ by weight. The weight ratio of $SiO_2$ to $Na_2O$ in both the grains and the solution was between 3.3 and 3.4, and quantities of the grains and solution were used in the approximate volume ratio 100:30 so that the resulting layer had a total water content of approximately 34% by weight. In a variant of this Example, hydrated sodium silicate grains containing an excess of water were applied to the glass sheet and subjected to a heat treatment such as to cause them to coalesce into a "sintered" layer containing 34% by weight water.

EXAMPLE 2 (FIG. 5)

The intermediate product of Example 1 (shown in FIG. 5 as sheet 27 and layer 29) has applied thereto a second glass sheet 28 also 5 mm thick, and this sandwich assembly is held together by a frame 30.

EXAMPLE 3 (FIG. 5)

In a variant of Example 2, the frame 30 is not used. The edges of the assembly are taped as described with reference to FIG. 6, and the sandwich is bonded together by the method described with reference to FIGS. 1 and 2 to give a high quality transparent fire screening glazing panel.

EXAMPLE 4

In a variant of Example 3, the intumescent layer 29 of grains in a binder is replaced by a layer of grains only. These grains are of hydrated sodium silicate having a diameter of 1.2 mm and a water content of 35% by weight. This assembly is bonded together by a process as described with reference to FIGS. 1 and 2 so that the granular layer became converted into a solid layer 2 mm thick bonding the two glass sheets together.

EXAMPLE 5 (FIG. 6)

Each glazing sheet 31, 32, 33 was of glass 3 mm thick and was coated with a stratum respectively 34, 35, 36 of hydrated sodium silicate 1.1 mm thick. These strata were formed by pouring onto the sheets, while horizontal, a solution having the following properties: weight ratio $SiO_2$:$Na_2O$ 3.3 to 3.4, density 37° to 40° Baumé.

The thus formed strata were then dried to contain 34% by weight residual water.

The coated sheets were then held assembled in spaced relation on their edges using adhesive tape leading round the edges of the assembly but leaving the top open. Granular hydrated sodium silicate of the same composition as the dried strata was then introduced into the inter sheet spaces to form the strata 37, 38. The top edge of the assembly was then closed and the sandwich was bonded together by heat and pressure to form a transparent fire-screening glazing panel.

Inavariant of this Example, only a few grains were used, merely sufficient to separate the plies sandwiching them, in order to provide degassing pathways during the bonding process.

EXAMPLE 6

In a variant of Example 2 the glass sheets were chemically tempered.

EXAMPLE 7 (FIG. 7)

Each glass sheet 41, 42 was 5 mm in thickness. The glass sheets were held in spaced relation by bodies 44 of synthetic rubber glued to their margins but leaving one side open. The assembly was stood on edge with its open side uppermost and the inter-sheet space, which was 4 mm thick was then filled with grains of hydrated sodium silicate (33% by weight water content) as intumescent material. The grain size was 1 to 1.5 mm, selected by sifting with appropriately sized meshes. The open side of the panel was then sealed by gluing in a further strip of synthetic rubber. In a variant embodiment, grains having a lower water content was used, and prior to sealing of the open side, water was introduced in an amount less than the volume of the grains, so as to displace air from the inter-sheet space and raise the total water content of the layer to about 34% by weight.

EXAMPLE 8 (FIG. 7)

A body 44 of porous plastics spacer material was laid along three side margins of a rectangular glass sheet 41 and a second sheet 42. The inter sheet space was then filled with intumescent material and a strip of the porous plastics spacer material was then laid between the fourth side margin of the glass sheets. The intumescent material used consisted of grains of hydrated sodium silicate 1.2 mm. in diameter.

The thus formed assembly was then placed in an envelope and subjected to the simplified bonding process described with reference to FIG. 3 to convert the intumescent material 43 to a transparent layer bonding the two glass sheets together. The pressure within the envelope was reduced to 100 mm Hg. After bonding, the spacer material 44 was removed to leave a peripheral groove leading around the panel which was then filled with sealing material.

EXAMPLE 9

In a variant of Example 8, the assembly was subjected to a bonding process described with reference to FIGS. 1 and 2 to form a transparent fire-screening glazing panel.

In a variant of this Example the assembly was formed in a different way. The first glass sheet 41 was laid horizontally and porous plastics spacer material 44 was applied to its margins. The hydrated sodium silicate solution specified in Example 5 was spread out on the glass sheet in an amount of 100 ml/m² to act as a binder for subsequently applied grains of hydrated sodium silicate. The grains were of substantially uniform size (1.2 mm diameter) and were applied at a bulk volume rate of 2 l/m². The second glass sheet 42 was then applied to the thus formed layer and the assembly was bonded together.

EXAMPLE 10

In a variant of Example 5 the two outer glass sheets 31, 32 were 5 mm thick and the middle sheet 33 was 3 mm thick, and the intumescent material used was hydrated potassium silicate.

EXAMPLE 11

As a variant of the preceding Examples in which hydrated sodium silicate was used as intumescent material, each glass sheet face which in the finished panel would border the intumescent material was given a protective coating of zirconium oxide which was 400 Å thick deposited by pyrolysis. In a variant of this example the zirconium oxide coating was replaced by one of anhydrous aluminium phosphate.

EXAMPLE 12

In a variant of Example 3, the intumescent layer 29 was formed of hydrated sodium aluminium sulphate 0.3 mm thick, and the glass sheets 27, 28 were each 4 mm thick. Prior to formation of the sandwich, a 500 Å thick protective coating of anhydrous aluminium phosphate was applied to each glass sheet face destined to contact the intumescent layer. In a variant of this Example, the protective coating was of zirconium oxide.

EXAMPLE 13

In a variant of Example 2, the intumescent material used is hydrated potassium aluminate to form a layer 0.8 mm thick.

In a variant of this Example, the intumescent layer is formed of one of the following metal salts in hydrated form: potassium plumbate, sodium stannate, potassium stannate, potassium aluminium sulphate, sodium borate and sodium orthophosphate.

I claim:

1. A method of manufacturing a light-transmitting fire-screening glazing panel comprising at least one layer of intumescent material sandwiched between two structural plies of the panel comprising the steps of forming a said layer from at least one material of which at least the greater part by volume is in granular form, and securing the plies together.

2. A method as in claim 1 wherein the sandwich is subjected to heat and/or pressure conditions so that the plies become bonded together via the sandwiched intumescent material.

3. A method as in claim 1 or 2 including a degassing step in which the intumescent layer is subjected to suction at the edges of the sandwich.

4. A method of manufacturing a light-transmitting fire-screening glazing panel comprising at least one layer of intumescent material sandwiched between two structural plies of the panel comprising the steps of forming a said layer from intumescent material of which at least part is in the form of grains, forming an assembly comprising said two structural plies and said layer, subjecting the intumescent material to suction at the edges of the assembly in a degassing step and subjecting the assembly to heat and/or pressure conditions causing the grains in said layer to become assimilated into an intumescent body which bonds said structural plies together.

5. A method according to claim 4 wherein said intumescent layer is constituted by material of which at least the greater part by volume is in granular form.

6. A method according to claim 4 or 5 wherein the suction during the degassing step has an absolute value of between 1 and 250 mm.

7. A method as in claim 1 or 4 wherein the material of said intumescent layer is at least 70% by volume is in granular form.

8. A method as in claim 1 or 4 wherein said granular material is held together by a binder.

9. A method as in claim 8 wherein said binder is water or an aqueous solution of the intumescent material.

10. A method as in claim 1 or 4 wherein at least 90% of the weight of the granular material has a grain size of at least 0.1 mm.

11. A method as in claim 1 or 4 wherein the maximum grain size of the granular material is 2.5 mm or less.

12. A fire-screening glazing panel made by the method of claim 1 or claim 4.

13. A light-transmitting fire-screening panel comprising at least one layer of intumescent material sandwiched between two structural plies of glazing material, at least the greater part by volume of said material being in granular form.

14. A panel as in claim 13 wherein the grains of intumescent material are embedded in a binder.

15. A panel as in claim 14 wherein said binder is a solution of said intumescent material.

16. A panel as in claim 13 wherein the grains of intumescent material are sintered together.

17. A panel as in claim 13 wherein said intumescent material comprises a hydrated alkali metal salt.

18. A panel as in claim 17 wherein said intumescent material comprises a hydrated alkali metal silicate.

19. A panel as in claim 13 wherein each of said structural plies is of vitreous material.

20. An intermediate product for forming a multi-ply light-transmitting fire-screening glazing panel comprising a structural ply of glazing material bearing an adherent layer of which at least the greater part by volume consists of grains of intumescent material.

* * * * *